(12) United States Patent  
Gloisten (10) Patent No.: US 6,350,043 B1  
(45) Date of Patent: Feb. 26, 2002

(54) BEHIND PANEL MOUNT, DIRECTIONAL LIGHTING BRACKET

(75) Inventor: Jennifer L. Gloisten, Farmingville, NY (US)

(73) Assignee: Aerospace Lighting Corporation, Holbrook, NY (US)

( * ) Notice: Subject to any disclaimer, the term of this patent is extended or adjusted under 35 U.S.C. 154(b) by 0 days.

(21) Appl. No.: 09/621,114

(22) Filed: Jul. 21, 2000

(51) Int. Cl.[7] .............................................. F21V 21/00
(52) U.S. Cl. ...................... 362/287; 362/455; 362/365; 362/288
(58) Field of Search ................................ 362/362, 364, 362/368, 371, 372, 287, 147, 148, 470, 288, 285, 306, 455, 440, 434, 153.1

(56) References Cited

U.S. PATENT DOCUMENTS

| | | | |
|---|---|---|---|
| 2,554,258 A | 5/1951 | Lundquist | 362/364 |
| 2,782,295 A | 2/1957 | Schwenkler | 362/365 |
| 3,803,400 A | 4/1974 | Ozawa | 362/372 |
| 4,142,227 A | 2/1979 | Aikens | 568/761 |
| 5,377,087 A | 12/1994 | Yoon | 362/275 |
| 5,404,297 A | 4/1995 | Birk et al. | 362/421 |
| 5,672,004 A | 9/1997 | Schmidt, Jr. | 362/421 |
| 6,082,871 A * | 7/2000 | Yeh | 362/147 |

* cited by examiner

*Primary Examiner*—Alan Cariaso
*Assistant Examiner*—Hargobind S. Sawhney
(74) *Attorney, Agent, or Firm*—Collard & Roe, P.C.

(57) ABSTRACT

A lighting bracket assembly has a base, a lens holder, a retaining ring and a light housing. The base has a locking channel and a top edge radiused to define a first sphere. The lens holder is disposed within the locking channel and is adapted to provide upon installation of the assembly an external surface continuous with a surface defining an opening into which the assembly is installed. The retaining ring is fastened to the base and biases the light housing. The light housing comprises a back portion with an outer circumference and a plurality of curved wing members defining the contour of a second sphere concentric to the first sphere extending from the back portion along the outer circumference. The light housing is adapted to rotate through an angular range of up to 20 degrees upon application of force against the bias of the retaining ring.

9 Claims, 7 Drawing Sheets

SECTION VI-VI
FIGURE 6

FIGURE 7

BEHIND PANEL MOUNT, DIRECTIONAL LIGHTING BRACKET

BACKGROUND OF THE INVENTION

1. Field of the Invention

The present invention relates to reading light brackets and more particularly to a lighting bracket assembly suitable for use in aviation applications.

2. The Prior Art

A number of lighting fixtures are known which are designed to be recessed within a ceiling. For example, U.S. Pat. No. 2,554,258 to Lundquist relates to an electric wall fixture having a universally mounted lamp for theatrical, architectural and commercial lighting.

The fixture includes a casing, a ceiling plate, a hollow spherical segment truncated on opposite sides to provide two circular openings, a yoke with arms which engage trunnions on the segment and a compression spring on a bolt above the casing. Pressing the arms together enable them to clear the trunnions to permit rotation of the yoke relative to the casing. The casing is supported in the ceiling by a plaster ring set in the ceiling having an integral out-turned flange at its lower edge, an annular plate providing a step at the exposed undersurface of the flange, and a ceiling plate seated on the ledge flush with the exposed surface of the ceiling. However, as shown in FIG. 1 of U.S. Pat. No. 2,554,258, this design has a rather pronounced protrusion of the lamp beyond both the annular plate and the ceiling plate.

A number of protruding ball and socket assemblies for aircraft that permit the orientation of light are also known with three pronged bezel elements as a retention mechanism to hold the lens in place. See U.S. Pat. No. 4,142,227 to Aikens and U.S. Pat. No. 5,377,087.

U.S. Pat. No. 5,404,297 to Birk et al. relates to an aircraft reading light including a ball-shaped housing and a lamp support assembly that is normally retained in but removable from the housing. The lamp support assembly includes coaxial inner and outer sleeves and a lamp socket mounted on one of the sleeves. The inner sleeve is movable relative to the outer sleeve between a braced position in which the lamp support assembly is retained in the housing, and a released position in which the lamp support assembly is released for removal from the housing. The outer sleeve includes a number of longitudinally directed fingers each provided with an outwardly directed detent. To replace a lamp, the inner sleeve is manually forced upwardly into the housing, which frees the fingers from an abutting surface and provides enough clearance between the fingers and the inner sleeve to radially permit inward deflection of the fingers sufficient to free the detents.

Other patents of general interest are U.S. Pat. No. 2,782,295 to Schwenkler; U.S. Pat. No. 3,803,404 to Ozawa; and U.S. Pat. No. 5,672,004 to Schmidt, Jr.

Although a variety of lighting fixture assemblies are known at the present time, there is still a need for a lighting bracket assembly which provides an aesthetically pleasing flush surface on the passenger side of an installation and which is capable of directing light through the center of a fixed lens while allowing rotation at installation throughout a range of up to 20 degrees from center in any direction, without tools, and then locking in place.

SUMMARY OF THE INVENTION

A lighting bracket assembly is provided for use, for example, in airborne reading light applications, which offers significantly greater mounting flexibility then conventional designs for aircraft lighting systems. The lighting bracket has a base, a lens holder, a retaining ring, and a light housing, all preferably formed from molded plastic.

The base, which may have a textured surface, is preferably adapted to be fastened to an installation and has a top edge radiused to define a first sphere, and bottom edge which forms a locking channel.

The lens holder is disposed within the locking channel and is adapted to provide upon installation of the assembly an external surface continuous with the surface behind which the assembly is installed.

The retaining ring is fastened to the base and may include a plurality of stop members for limiting rotation of the light housing. Preferably, three stop members are spaced 120 degrees apart to limit rotation such that the light housing wing member opposite the stop cannot rotate free from the retaining ring.

The light housing is biased by the retaining ring and includes a back portion with an outer circumference from which a plurality of curved wing members extend. Preferably, three wing members are equally spread from each other along the outer circumference of the light housing back portion. The wing members, which may be provided at their bottom surfaces with a compliant material, define the contour of a second sphere concentric to the first sphere extending from the back portion along the outer circumference. The light housing is adapted to rotate through an angular range of up to 20 degrees upon application of force against the bias of the retaining ring.

Preferably, the retaining ring has a plurality of screws mounted through a plurality of coil springs then through clearances in the top edge of the base and are fastened into the bushings. The wing members receive pressure applied by the springs from the retaining ring to lock the light housing against the base at a high friction interface preventing rotation. The light housing is adapted to rotate through an angular range of up to 20 degrees upon application of force to the light housing against the pressure applied by the springs.

This invention may also be embodied such that rotation is limited to a two dimensional arc crossing the vertical axis of the light source, but is not limited to these configurations.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

The behind panel mount, directional lighting bracket assembly of the invention enables a light source to illuminate through the center of a fixed lens incorporated in an aesthetically pleasing, continuous surface, while permitting directional adjustment through an angular range of up to twenty (20) degrees. The bracket allows aircraft interior designers to create smooth contour passenger service units, devoid of the typical protrusions necessitated by conventional reading light mounting hardware.

The lighting bracket assembly 10 of a preferred embodiment is shown in FIGS. 1A, 1B, 6 and 7 and comprises a base 20, a lens holder 30, a retaining ring 40, and a light housing 50. Preferably, these four primary components are fabricated from molded plastic. Standard screws, bushings, washers and springs may be used in the assembly. Materials used in the assembly preferably comply with federal regulation FAR 25.853 governing flame resistance and meet the airborne environmental requirements of RTCA DO-160. Electrical components are protected against environmental conditions including shock and vibration.

Figure 1A:
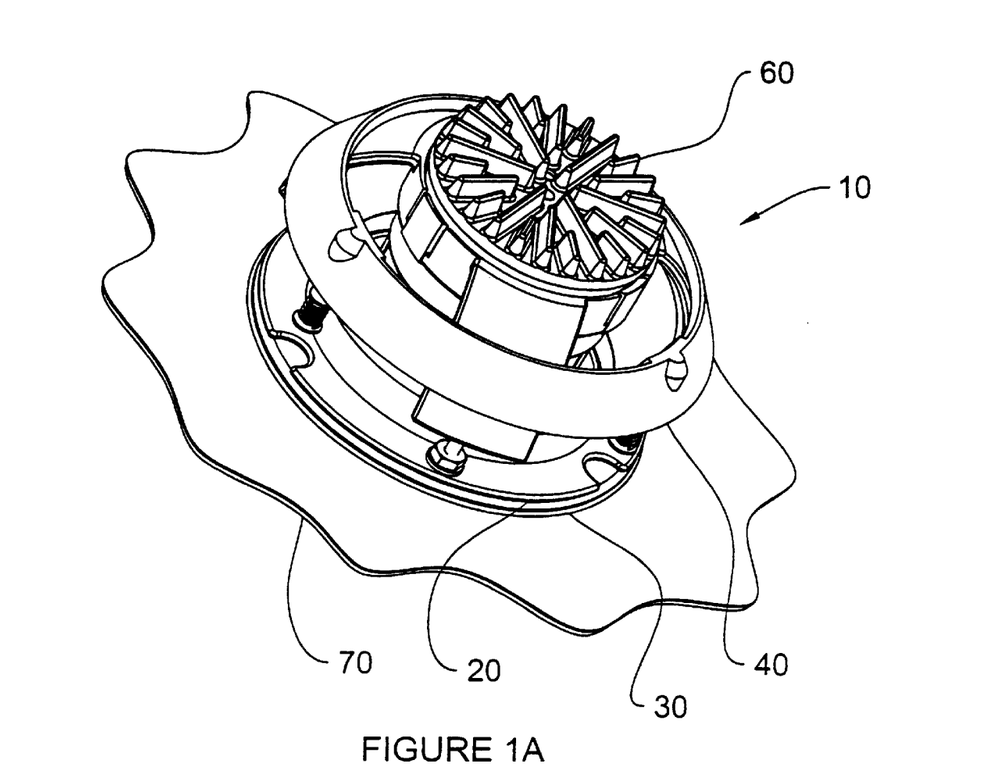
FIGS. 1A and 1B are top perspective and side views, respectively, of an embodiment of the present invention.
Figure 1B:
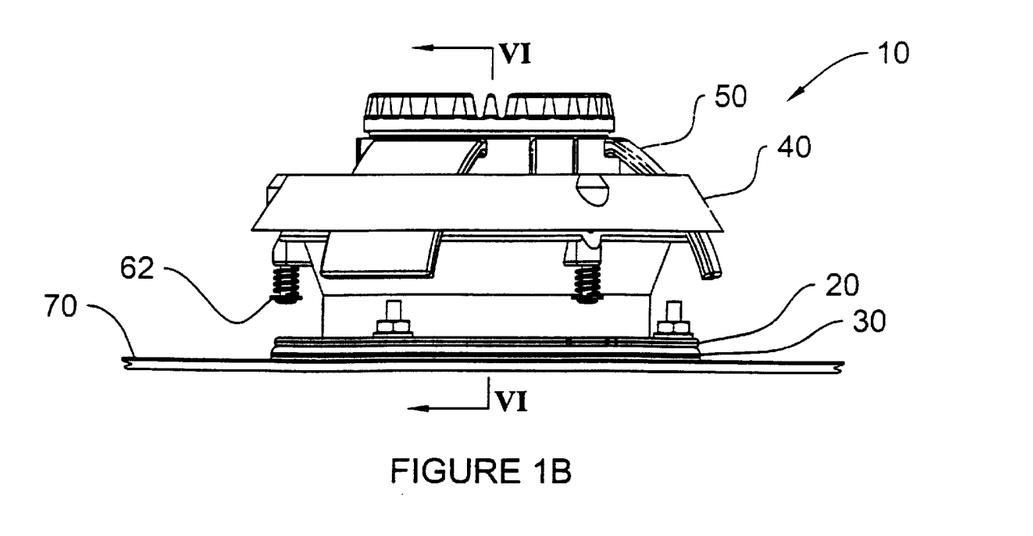

A standard reading light module 60, such as a B/E Aerospace AL5500 LED Reading Light available from the assignee of this application, preferably snap fits into light housing 50. As shown in FIGS. 1A and 1B, light housing 50 envelops the circumference of the reading light, leaving the top portion of reading light module 60 open for installation, electrical connections, and heat dissipation.

Figure 2A:
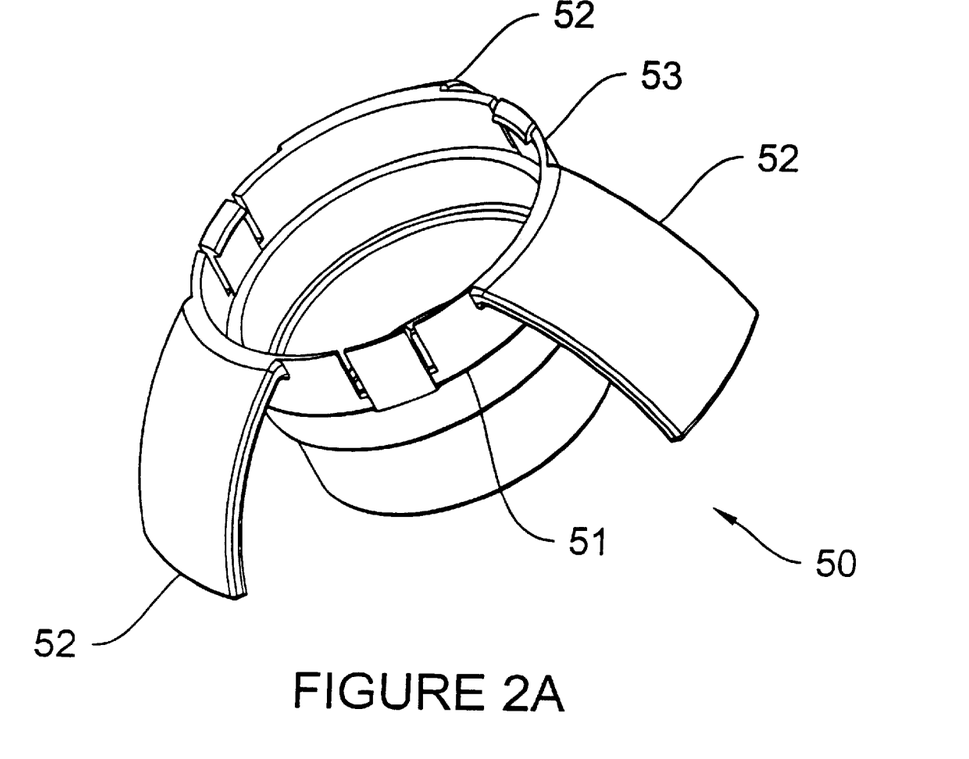
FIGS. 2A and 2B are top perspective and side views, respectively, of the light housing of the embodiment shown in FIGS. 1A and 1B.
Figure 2B:
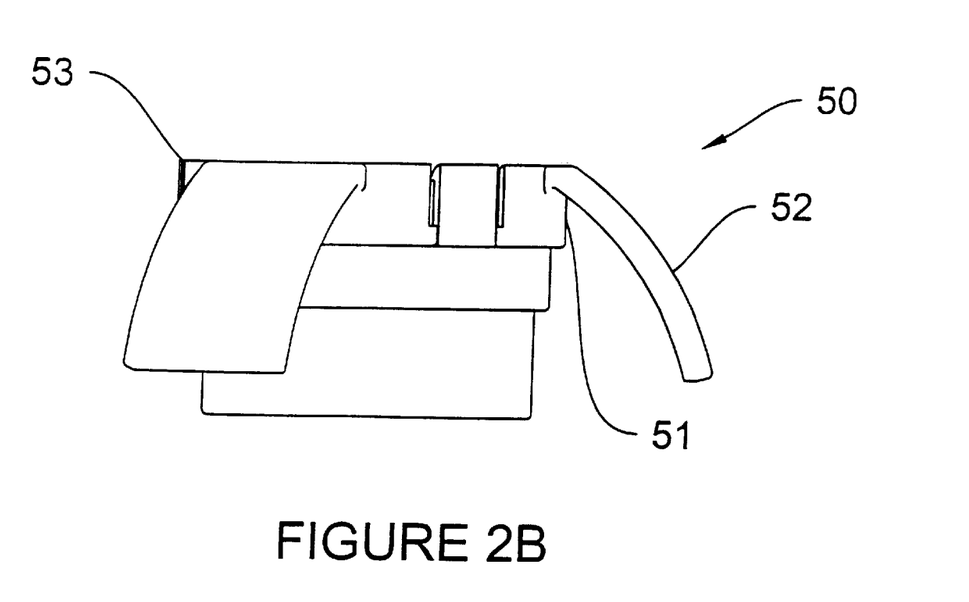
Figure 3A:
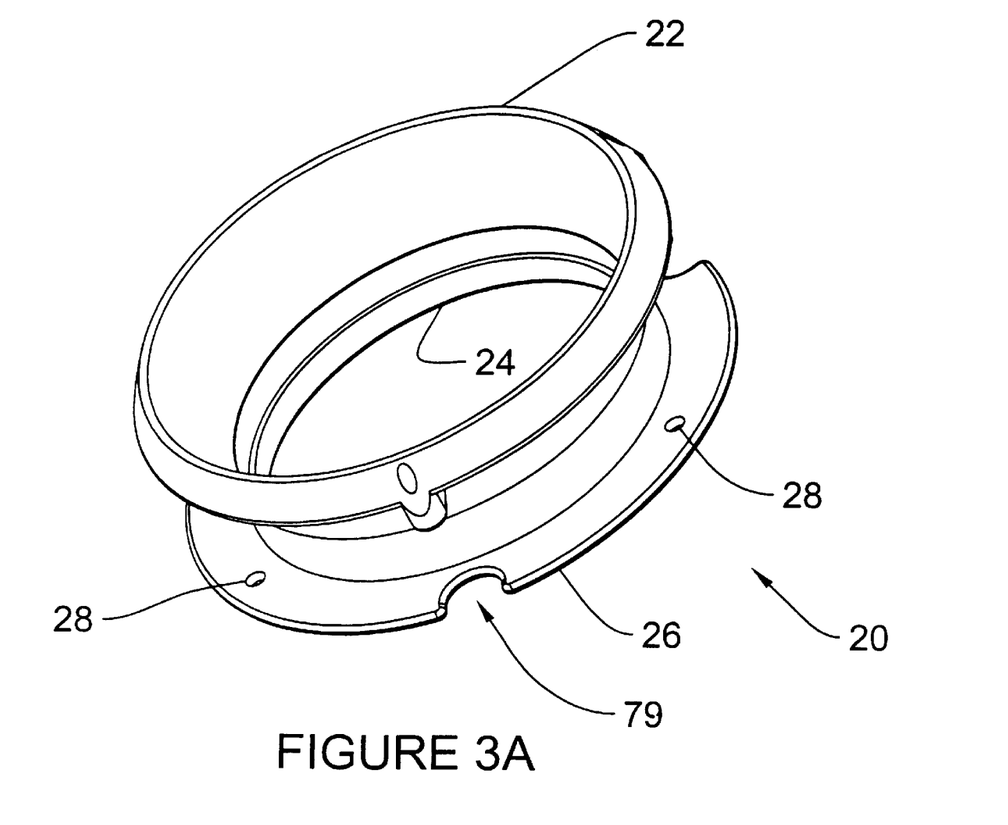
FIGS. 3A and 3B are top perspective and side views, respectively, of the base of the embodiment shown in FIGS. 1A and 1B.
Figure 3B:
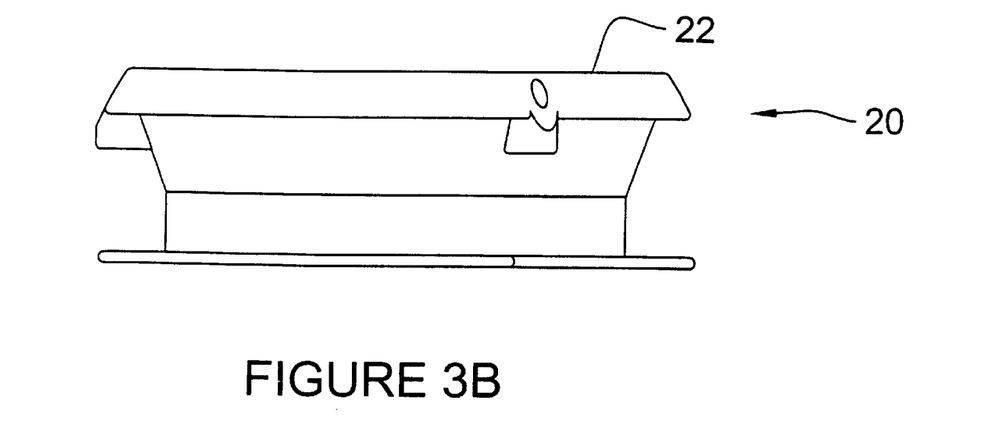
Figure 4A:
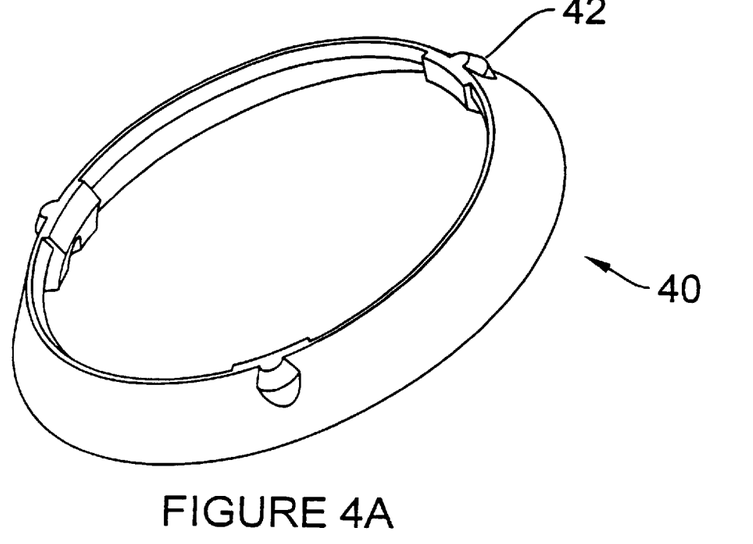
FIGS. 4A, 4B and 4C are top perspective, side, and bottom perspective views, respectively, of the retaining ring of the embodiment shown in FIGS. 1A and 1B.
Figure 4B:
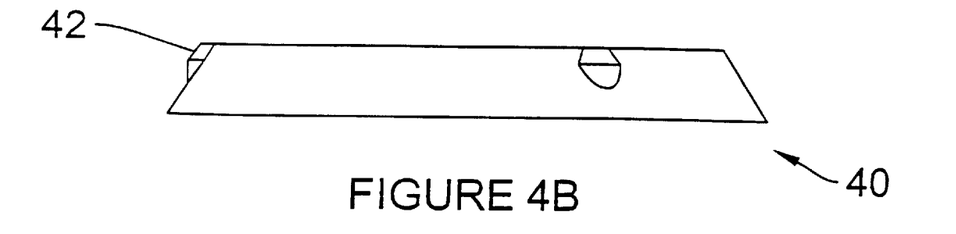
Figure 4C:
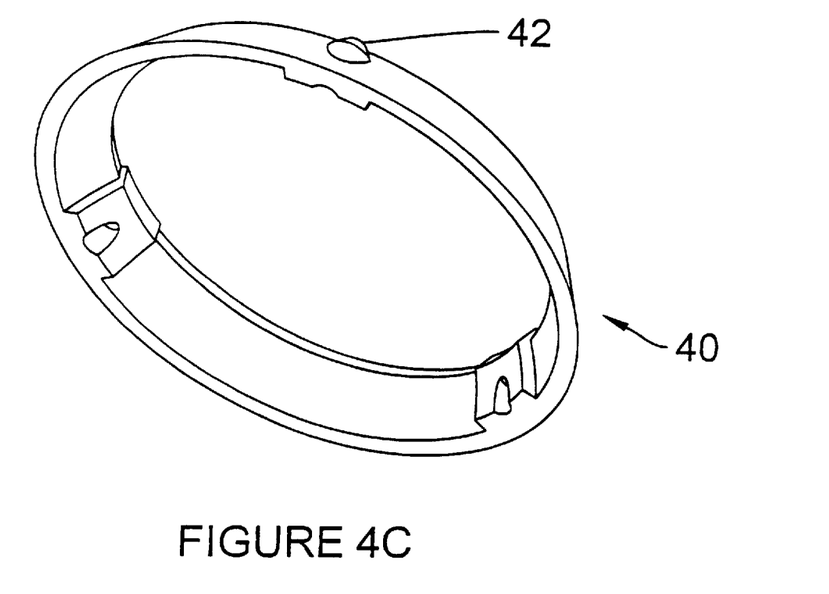
Figure 5A:
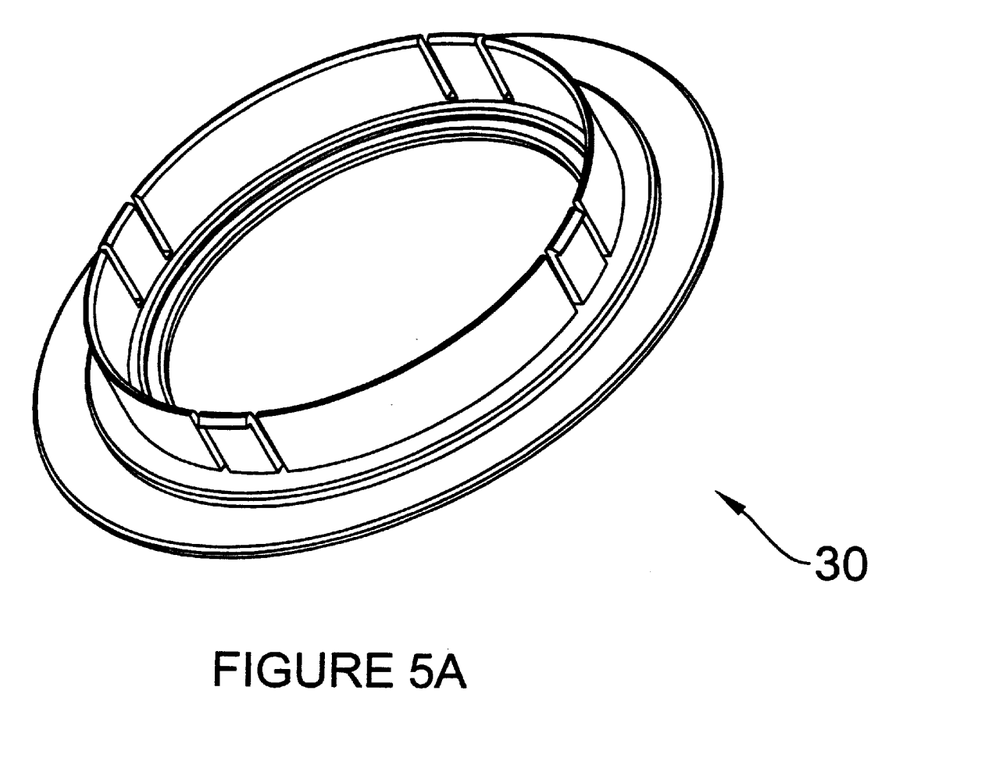
FIGS. 5A and 5B are top perspective and side views, respectively, of the lens holder of the embodiment shown in FIGS. 1A and 1B.
Figure 5B:
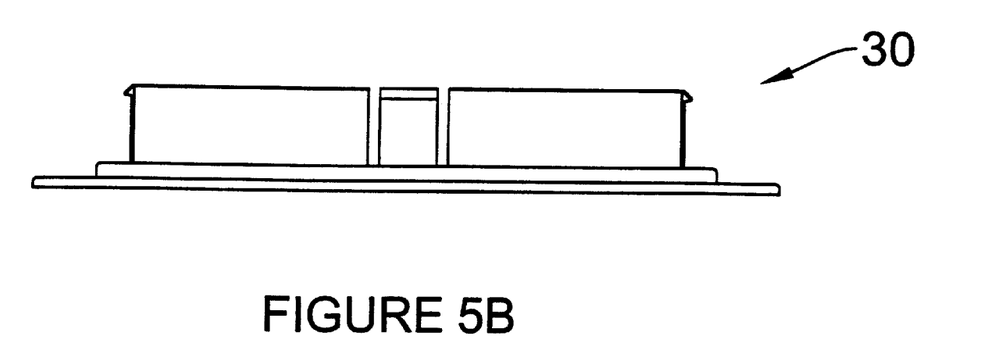
Figure 6:
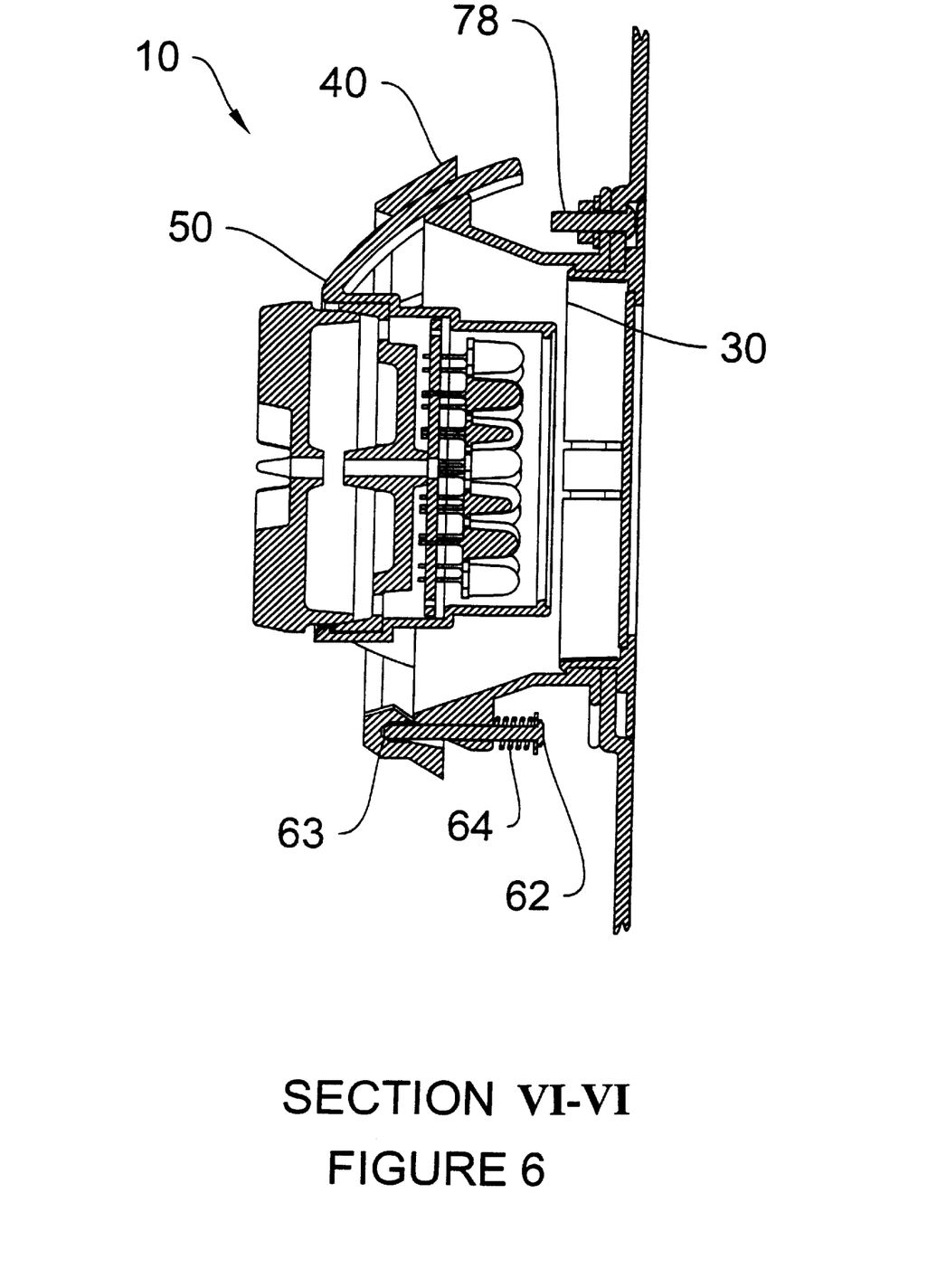
FIG. 6 is a side cross-sectional view taken along section line VI—VI of FIG. 1B.
Figure 7:
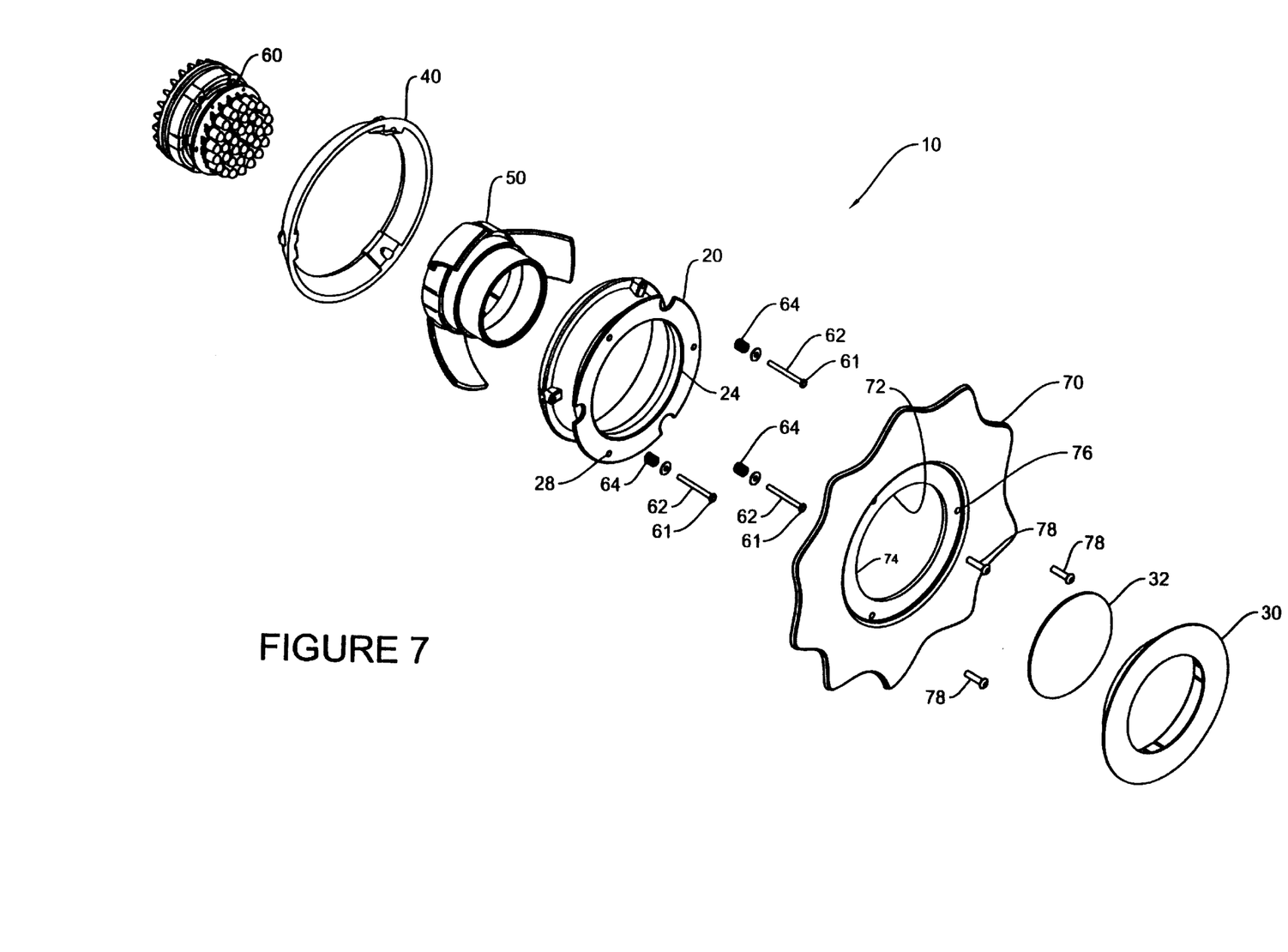
FIG. 7 is an exploded perspective view of the embodiment shown in FIGS. 1A and 1B.

FIGS. 2A and 2B show light housing 50; FIGS. 3A and 3B show base 20; FIGS. 4A, 4B and 4C show retaining ring 40; and FIGS. 5A and 5B show lens holder 30. Assembly 10 is designed to be installed on a mounting surface or panel 70, such as a passenger service unit, which contains a circular opening 72, usually approximately 50 mm in diameter, set within a shallow, typically circular indentation 74 in panel 70. As shown in FIG. 7, edges of indented area 74 accommodate typically three mounting holes 76. Base 20 serves as the platform for the functional components of bracket 10, accepting the mounting hardware that attaches bracket assembly 10 to a passenger service unit panel 70. As shown in FIGS. 3A and 3B, base 20 has a locking channel 24 on its internal surface and a top edge 22 radiused to define a first sphere and a bottom portion 26 shaped to serve as a mounting flange. Top edge 22 is preferably textured or coated to increase friction. A plurality of mounting holes 28 may be provided in bottom portion 26 to permit installation of assembly 10 using standard hardware. Preferably, three equally spaced mounting holes 28 are cut in bottom portion 26 aligned with mounting holes 76 in indented area 74 of panel 70. Preferably, three equally spaced clearances 79 are provided aligned with screws 62, for the purpose of assembly.

As shown in FIGS. 2A and 2B, light housing 50 comprises a back portion 51 with an outer circumference 53 and a plurality of curved wing members 52 defining the contour of a second sphere concentric to the sphere described by top edge 22 of base 20. Preferably, three equally spaced, curved structures or wing members 52 extend from back portion 51 of light housing 50 at the top of outer circumference 53. The sphere described by wing members 52 defines the rotational path of light housing 50 and is centered at the back of the lens surface of lens 32 (see FIG. 7) held by lens holder 30. The three wing structures or wing members 52 rest on top edge 22 of base 20 and hold the lighting bracket assembly 10 in place via frictional forces at the interface between the bottom of the light housing wing members 52 and the top edge 22 of base 20. This high friction interface restrains light housing 50 during normal operation. Friction between base 20 and light housing 50 may be increased by adding a compliant material to one surface, preferably light housing 50, and texture to the other, preferably base 20.

Locking force is supplied to the interface between light housing wing members 52 and base 20 by retaining ring 40, shown in FIGS. 4A, 4B and 4C. Retaining ring 40 is loosely fastened to base 20 preferably by three screws 62 having screw heads 61 mounted through clearances in top edge 22 of base 20. Screws 62 pass through the open area between light housing wing members 52 and are fastened into bushings 63 in retaining ring 40. A plurality of springs, preferably compression springs 64, are disposed between screw heads 61 and base 20 and push screws 62 and retaining ring 40 downward, applying pressure to the tops of wing members 52. This arrangement ensures pressure at the high friction contact between base 20 and housing 50. During directional set up, gentle upward pressure on the housing biases housing wing members 52 against retaining ring 40 but away from base 20, releasing frictional lock between the base surface 22 and underside of wing members 52.

As shown in FIGS. 4A, 4B and 4C, retaining ring 40 may include a plurality of stand-offs or stop members 42 for limiting rotation of light housing 50. Preferably three stop members 42 spaced 120 degrees apart are designed into retaining ring 40 in order to achieve 20 degree rotation from the central axis on a 2 inch diameter assembly without freeing light housing wing members 52 from the retaining ring 40. Stop members 42 limit rotation to 17 degrees at the three locations spaced 120 degrees apart, such that housing wing member 52 remains under retaining ring 40. Particularly with smaller diameter lights, retaining ring 40 may be designed without stop members 42 and achieve 20 degrees of angular rotation in all directions.

Lighting bracket assembly 10 also includes lens holder 30 as shown in FIGS. 5A and 5B. Lens holder 30 is disposed within locking channel 24, preferably by snapping lens holder 30 into locking channel 24 on the internal surface of base 20 as the last step of installation. Lens holder 30 is adapted to provide upon installation of assembly 10 an external surface continuous with the surface behind which assembly 10 is installed. Thus, lens holder 30 serves as the cosmetic interface to the aircraft cabin and carries lens 32 which may be light diffusing or directing.

The behind panel mount bracket assembly of the present invention satisfies cosmetic requirements for a nearly featureless exterior surface, while providing easy, tool-free directional set up to within 20 degrees of vertical. Assembly 10 is installed by mounting the bottom of base 20 behind panel 70 using standard hardware such as screws 78 shown in FIG. 7 and then snap fitting lens holder 30 carrying lens 32 into base 20.

Assembly 10 may be adjusted prior to installation of lens holder 30 by pressing upwardly and gently on light housing 50 against the spring tension. This action disengages the high friction interface between rotational support wings 52 and base 20 and allows light housing 50 to rotate against the smooth surface of retaining ring 40 to the desired position.

Upon release, tension from springs 64 allows retaining ring 40 to recapture the rotational support against base 20 at the high friction interface, securely holding assembly 10 throughout normal shock and vibration conditions of the aircraft. This invention may also be embodied such that rotation is limited to a two dimensional arc crossing the vertical axis of the light source.

Once behind panel mount assembly 10 has been positioned, lens holder 30 snaps into base 20 from below. Lens holder 30 fills indentation 74 surrounding light opening 72, conceals all mounting hardware such as screws 78, and leaves a flat surface across the entire installation with lens 32 and panel 70 flush. Cosmetic continuity of the passenger service unit surface may be preserved by applying matching color and texture to lens holder 30.

The lighting bracket assembly allows directional adjustment for initial set up without tools, but is inaccessible to an aircraft passenger. It may provide directional adjustment of a light source such that the light beam remains centered at its point of travel through a fixed lens mounted flush with a panel exterior.

While preferred embodiments of the present invention have been shown and described, it is to be understood that many changes and modifications may be made thereunto without departing from the spirit and scope of the invention as defined in the appended claims.

What is claimed is:

1. A lighting bracket assembly comprising:
   (a) a base having a top edge radiused to define a first sphere and a bottom edge shaped to form a locking channel;
   (b) a lens holder disposed within the locking channel and adapted to provide upon installation of the assembly an external surface continuous with a surface behind which the assembly is installed;
   (c) a retaining ring fastened to the base; and
   (d) a light housing biased by the retaining ring, said light housing comprising a back portion with an outer circumference and a plurality of curved wing members defining the contour of a second sphere concentric to the first sphere extending from the back portion along the outer circumference, said light housing adapted to rotate through an angular range of up to 20 degrees upon application of force against the bias of the retaining ring.

2. A lighting bracket assembly according to claim 1 wherein the base, the lens holder, the retaining ring, and the light housing are formed from molded plastic.

3. A lighting bracket assembly according to claim 1 wherein the light housing comprises three wing members equally spaced from each other along the outer circumference of the light housing back portion.

4. A lighting bracket assembly according to claim 1 wherein the wing members have a bottom surface comprising a compliant material and the base has a textured surface.

5. A lighting bracket assembly according to claim 1 wherein the retaining ring comprises a plurality of stop members to prevent rotation of the light housing beyond the range where the light housing is freed from the retaining ring.

6. A lighting bracket assembly according to claim 1 providing directional adjustment of a light source such that a light beam of the light source remains centered at a point of travel of the light beam through a fixed lens mounted flush with a panel exterior.

7. A lighting bracket assembly according to claim 1 wherein the base comprises a bottom portion having three equally spaced holes for mounting the assembly.

8. A lighting bracket assembly according to claim 1 wherein directional adjustment without tools for initial set up is permitted but upon installation the assembly is inaccessible to an aircraft passenger.

9. A lighting bracket assembly according to claim 1 comprising:
   (a) a base having a top edge radiused to define a first sphere and a locking channel, said base adapted to be fastened to an installation;
   (b) retaining ring comprising a plurality of bushings;
   (c) a plurality of screws fastened into the bushings in the retaining ring through the top edge of the base, each of said screws having a screw head;
   (d) a plurality of springs disposed between the screw heads and the base; and
   (e) a light housing comprising a back portion with an outer circumference and three equally spaced curved wing members defining the contour of a second sphere concentric to the first sphere extending from the back portion along the outer circumference, said wing members receiving pressure applied by the springs from the retaining ring to lock the light housing against rotational motion, said light housing adapted to rotate through an angular range of up to 20 degrees upon application of force to the light housing against the pressure applied by the springs.

* * * * *

UNITED STATES PATENT AND TRADEMARK OFFICE
CERTIFICATE OF CORRECTION

PATENT NO. : 6,350,043 B1
DATED : February 26, 2002
INVENTOR(S) : Jennifer L. Gloisten It is certified that error appears in the above-identified patent and that said Letters Patent is hereby corrected as shown below:

<u>Column 6,</u>
Line 6, please add "a" before the word "retaining".

Signed and Sealed this

Fourth Day of June, 2002

Attest:

Attesting Officer

JAMES E. ROGAN
*Director of the United States Patent and Trademark Office*